United States Patent [19]

Adams, Jr. et al.

[11] 4,202,108
[45] May 13, 1980

[54] APPARATUS AND METHOD FOR MARKING POINTS AND LINES DURING BUILDING CONSTRUCTION

[76] Inventors: Daniel Adams, Jr., 812 N. Herman St.; Chester W. Craig, Sr., 504 Vann St., both of Goldsboro, N.C. 27530

[21] Appl. No.: 931,391

[22] Filed: Aug. 4, 1978

[51] Int. Cl.² .............................................. G01B 3/08
[52] U.S. Cl. ...................................... 33/189; 33/161; 33/180 R; 33/414
[58] Field of Search ................. 33/189, 286, 161, 158, 33/143 R, 180 R, 413, 414

[56] References Cited

U.S. PATENT DOCUMENTS

| | | | |
|---|---|---|---|
| 2,245,646 | 6/1941 | Bullivant | 33/161 |
| 3,328,887 | 7/1967 | Wright | 33/161 |

*Primary Examiner*—Willis Little
*Attorney, Agent, or Firm*—Oblon, Fisher, Spivak, McClelland & Maier

[57] ABSTRACT

An apparatus and method for marking points and lines during building construction, includes a layout tool having a plurality of elongate members adjustably secured together for axial extension relative to one another to different lengths, the members defining a tubular body in which a pendulum or plumb rod is suspended for indicating when the tool is vertical in a first plane, and having a level thereon for indicating when the tool is vertical in a second plane perpendicular to the first plane, and pointers at the top and bottom ends of the tool, for alignment of one of the pointers with an existing line or point, whereby another line or point may be marked at the other pointer after the tool has been made vertical in both planes, the plumb rod being enclosed within the tubular body and thus being unaffected by wind. Chalk line holders are included for marking a line after the points have been determined. The method of marking points and lines using the apparatus is also disclosed.

17 Claims, 13 Drawing Figures

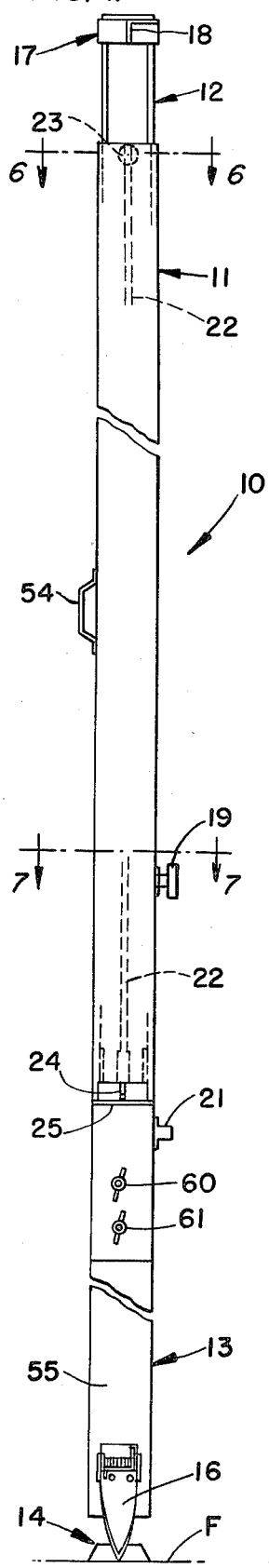
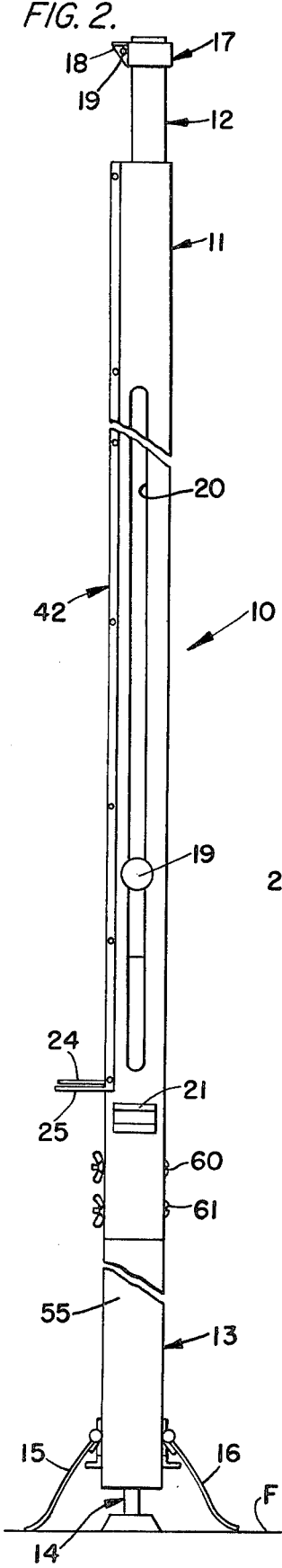
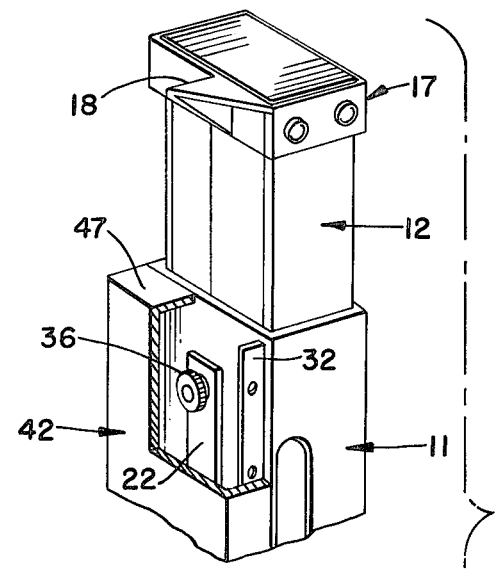
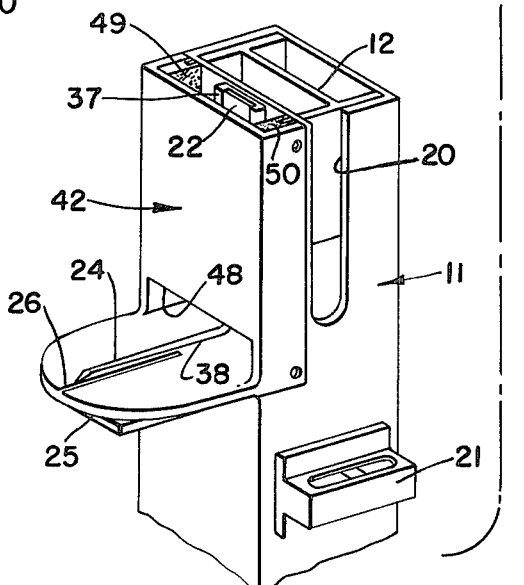
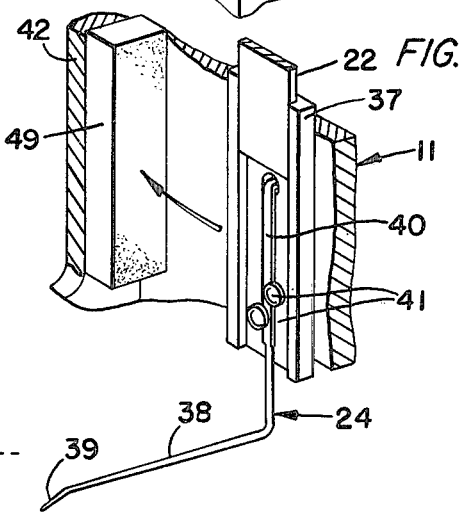

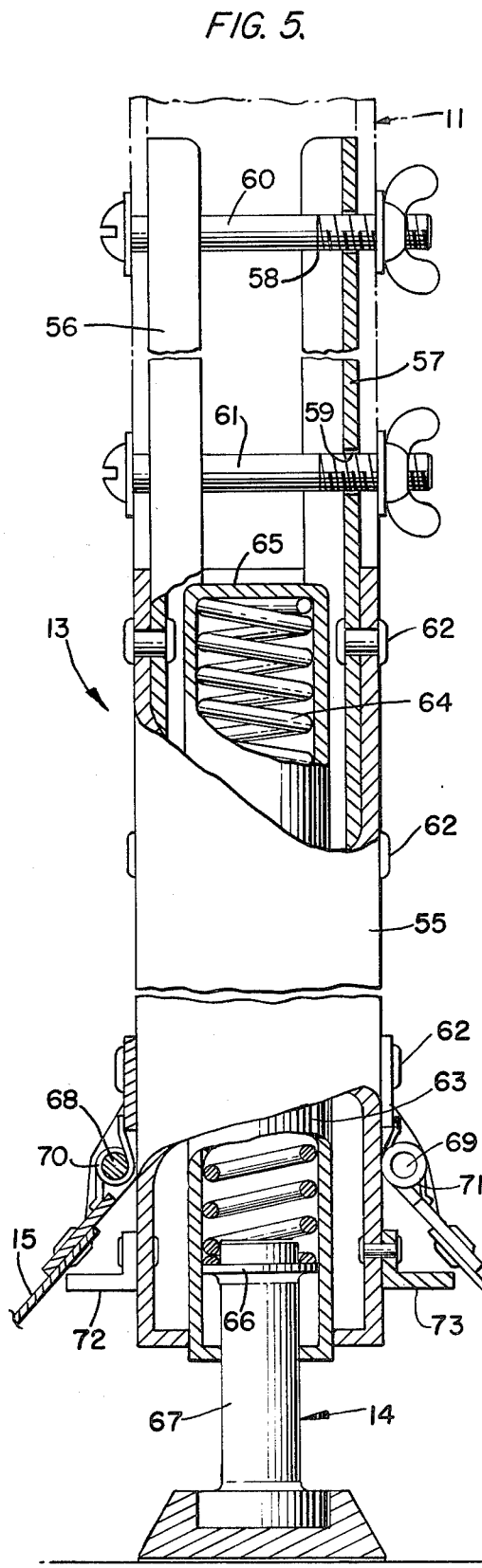
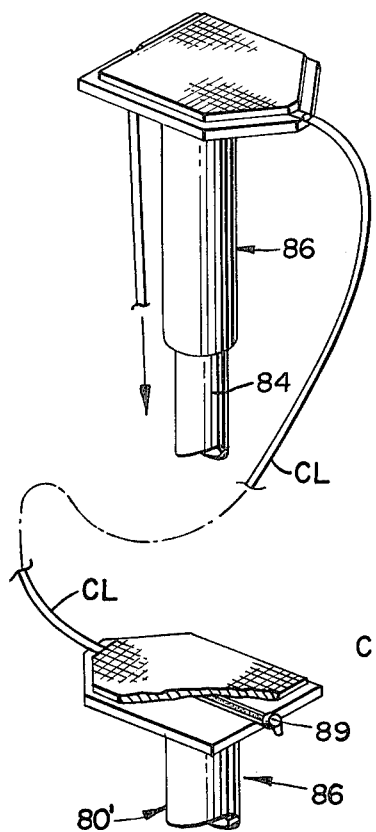
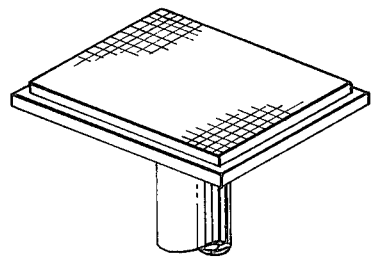
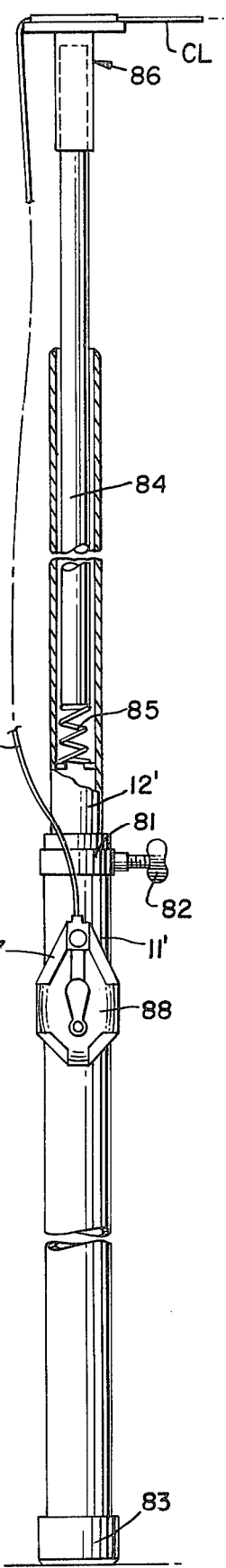

APPARATUS AND METHOD FOR MARKING POINTS AND LINES DURING BUILDING CONSTRUCTION

BACKGROUND OF THE INVENTION

A. Field of the Invention

This invention relates generally to means for marking points or lines on surfaces for later installation of walls or partitions and the like. More particularly, the invention comprises an apparatus or tool wherein means is provided for aligning the tool with a preexisting line or mark on the floor or ceiling surface of a building and for then disposing the tool in a vertical position for subsequent marking of another line or point on the other of the floor or ceiling surfaces in vertical alignment with the preexisting line or point. The lines or points thus marked are then used to guide the installation of tracks or channels for supporting the partition or wall structures.

As generally practiced in the prior art, such lines or points require at least two persons working in cooperation with one another with one of the persons typically being required to stand upon a ladder or the like for reaching the ceiling surface, since in most buildings with which the invention is used the distance between the floor and ceiling surfaces is typically on the order of ten feet. This practice is not only time-consuming and expensive, but is also dangerous, since the workman must occassionally mark a line or point adjacent an outer edge of a floor or ceiling surface, and in multistory buildings the workmen are required to subject themselves to the danger of falling from a considerable height. Additionally, conventional means used in marking such lines and points typically comprises a plumb-bob having a flexible line with a weight suspended at the bottom end thereof, and one of the workman supports the flexible line at the ceiling surface while the other workman observes the position of the plumb-bob at the floor surface. In the building construction industry, and particularly for multistory buildings, high winds are frequently encountered and a great deal of difficulty is experienced in obtaining an accurate reading from such prior art methods.

Therefore, in view of the above problems, efforts have been made in the prior art to produce an instrument or tool which would facilitate the marking of such points and lines.

B. Prior Art

Examples of some of the prior art efforts are exemplified in U.S. Pat. Nos. 1,952,745, 2,245,646, 2,846,770, 3,277,579, 3,328,887 and 3,492,737. However, although these patents do solve some of the problems noted above, they still have one or more disadvantages. For example, some of the devices are not very accurate in use and do not provide ease of operation. Others are relatively complex and expensive in construction, and still others are limited in the functions which they are capable of performing. Moreover, with all of the patents noted, more than one person would apparently still be required in order to mark lines between points determined with the patented instruments. In other words, while some of the patents disclose that they are intended to be used by one person for marking the lines at designated edges at the top and bottom of the instruments, none of them suggests any means for holding or supporting a chalk line or the like whereby a line may be struck between marked points. Accordingly, one or more workmen would presumably still be required to mount a ladder in order to support a chalk line at the ceiling surface for striking a line on the ceiling surface between two marked points.

SUMMARY OF THE INVENTION

The present invention, on the other hand, provides an apparatus and method for laying out points and lines for interior walls and partitions and the like during building construction wherein a single workman or operator can quickly and easily utilize the apparatus of the invention for accurately marking points on the floor or ceiling and for striking a chalk line between marked points.

The apparatus of the invention includes a telescopic layout tool having a plurality of elongate members axially extensible relative to one another, and defining a tubular body in which a pendulum or plumb rod is suspended with a pointer visible externally of the body for indicating when the tool is vertical in one plane. A conventional bubble level is carried by the tool for indicating when the tool is vertical in a second plane transverse to the first plane, and pointers are provided at the top and bottom ends of the tool for accurate alignment with a desired point or line. The tool includes resiliently yieldable portions whereby the members may be telescoped to an axial length slightly greater than the dimension between a floor and ceiling, and releasably held in that axially adjusted position by the resiliently yieldable means. Moreover, the tool may be urged or pressed against the resiliently yieldable means to release it from contact with one of the surfaces, whereby the tool may be removed for subsequent placement at another location. The tool also includes means for holding a chalk line, whereby once the tool is accurately positioned, a chalk line may be stretched taut between the tool and another support and snapped to strike a line between two desired points. In this last connection, the apparatus further includes extensible chalk line holding or supporting rods or tools which may be manipulated by a workman standing on the floor for striking a chalk line on a ceiling surface. The chalk line supporting tool may be used in combination with the layout tool, or the layout tool may be used to mark points, and one or more chalk line supporting poles or tools then used to strike chalk lines between the points marked with the layout tool.

A marking rod is also included in the apparatus, whereby a workman standing on the floor can mark a point on a ceiling surface ten feet or more above the floor.

Attachments are also provided in the apparatus for enabling the layout tool to be lengthened before use in situations where greater than normal spacing exists between the floor and ceiling surfaces.

Therefore, with the apparatus according to the present invention, a single workman is enabled to quickly and accurately mark points and lines for the installation of interior walls and partitions during building construction, and such workman is not required to climb ladders or stools and the like in order to reach the ceiling surface nor is the workman required to expose himself to great danger at the outer edge of a floor or ceiling in a multistory building by standing on a ladder to mark points or lines on the ceiling surface. Moreover, the tool enables a vertical line to be quickly established even in the presence of high winds.

OBJECTS OF THE INVENTION

It is an object of this invention to provide an apparatus for use in marking points and lines for interior walls and partitions and the like in building construction wherein the points and lines may be determined and marked on a ceiling surface by a workman standing on the floor.

A further object of the invention is to provide a layout tool for use in marking points and lines on a ceiling surface, wherein the layout tool includes a plumb rod confined therewithin, whereby the plumb rod is not sensitive to ambient wind conditions.

Another object of the invention is to provide an apparatus for marking points and lines on vertically spaced horizontal surfaces, such as floor and ceiling surfaces in a building, wherein a tool is provided for determining true vertical alignment between a mark on the ceiling and a mark on the floor and the tool has means for supporting one end of a chalk line whereby a second tool or chalk line holder may be used to support the chalk line at a previously marked point so that a line may be drawn between the two tools by a workman standing on the floor.

A still further object of the invention is to provide a unique chalk line holder for holding a chalk line at a marked point on a ceiling surface above the elevation which a workman could normally reach from the floor, thereby enabling a workman to strike a chalk line on a ceiling surface without requiring the workman to stand on a ladder or the like.

An even further object of the invention is to provide a layout tool for marking points and lines for the installation of interior walls and partitions in a building construction, wherein the tool includes a plurality of elongate members releasably secured together in axially adjusted relationship and including resiliently yieldable means whereby the members may be axially adjusted to a length slightly more than the spacing between a floor and ceiling surface, and the resiliently yieldable means functions to firmly hold the tool in position and also enables the tool to be compressed against the resiliently yieldable means for removal of the tool from between the floor and ceiling surfaces.

An even further object of the invention is to provide a method of marking points and lines on a ceiling surface for the installation of interior walls and partitions and the like including the steps of determining the points and marking the points and lines while working from the floor.

A still further object of the invention is to provide a method of determining and marking points and lines on a ceiling surface for the subsequent installation of interior walls and partitions and the like, wherein a vertical alignment or layout tool is first aligned at its lower end with a preexisting mark on the floor and the upper end is then oriented in direct vertical alignment with the mark on the floor and a point is then marked at the upper end, said steps being performed by a single workman standing on the floor of the building.

BRIEF DESCRIPTION OF THE DRAWINGS

FIG. 1 is a front view in elevation of the layout tool according to the invention.

FIG. 2 is a side view in elevation of the layout tool.

FIG. 3 is an enlarged fragmentary perspective view, with portions broken away, of the layout tool of the invention.

FIG. 4 is a further enlarged fragmentary sectional view of a portion of the layout tool, showing one of the bumper means for the plumb rod.

FIG. 5 is a greatly enlarged fragmentary view with portions in section, of the lower end or foot-piece of the layout tool of the invention.

FIG. 8 is a side view in elevation, with portions broken away, and shown in section, of a chalk line holding tool for use in the apparatus of the invention.

FIG. 9 is an enlarged fragmentary perspective view of the chalk-line holders and friction pads at the upper ends of a pair of tools such as shown in FIG. 8.

FIG. 10 is an enlarged fragmentary perspective view of a friction pad for use with the tool of FIG. 8, wherein the pad would be used to hold the track or channel for the interior wall partition or the like.

DETAILED DESCRIPTION OF THE PREFERRED EMBODIMENT

Figure 13:
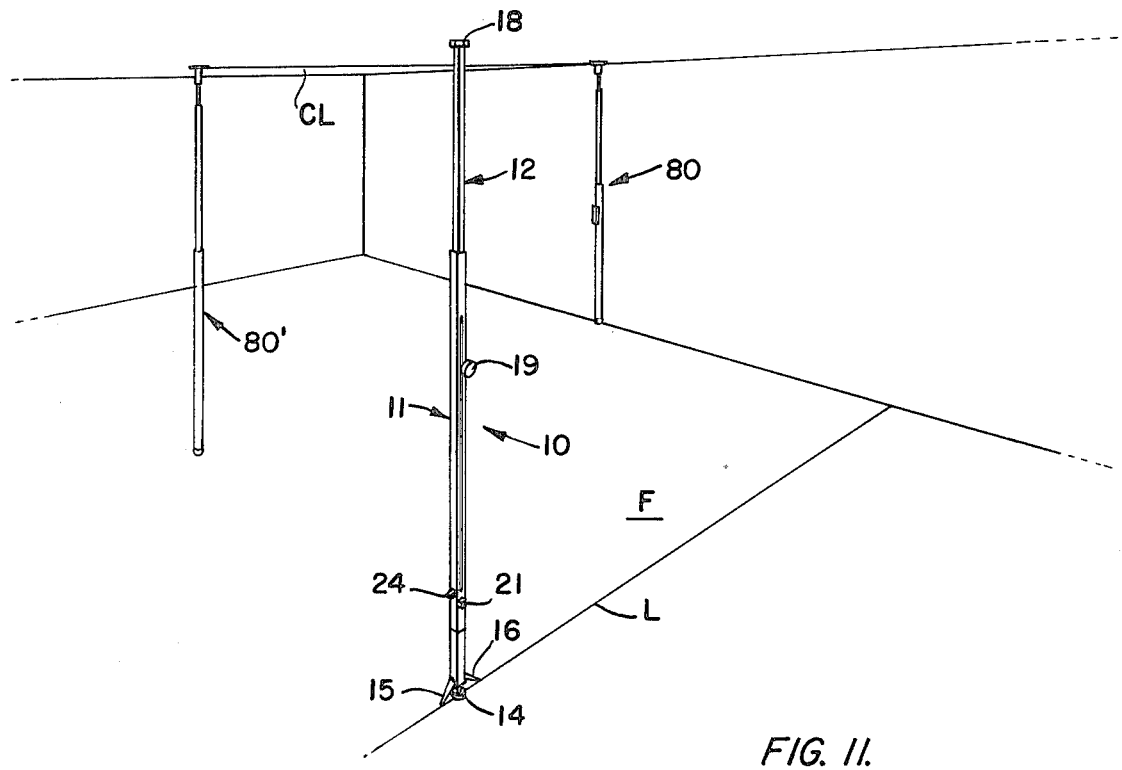
FIG. 13 is a diagrammatic view illustrating the apparatus of the invention being used to mark points and lines in a building structure.
Figure 11:
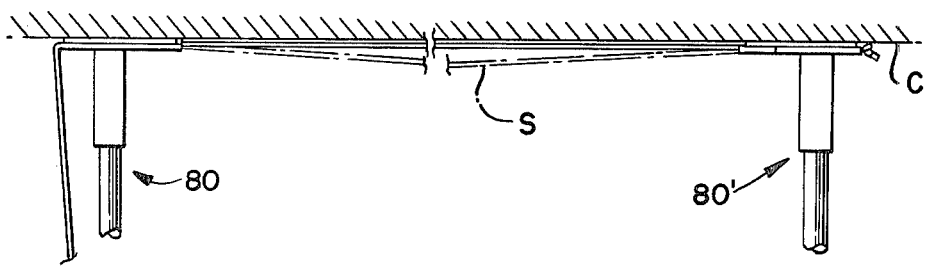
FIG. 11 is a somewhat diagrammatic view illustrating the manner in which the pair of chalk line holder tools would be used to support a chalk line to be snapped between a pair of spaced points.

In the drawings, wherein like reference numerals indicate like parts throughout the several views, the layout tool of the invention is indicated generally at 10, and comprises a plurality of elongate members 11 and 12 adjustably secured together for axial extension relative to one another to different lengths. A foot-piece or base 13 is removably secured to the lower end of member 11 and has a resiliently yieldable pad or foot 14 projecting from the lower end thereof for engagement with a floor F, and a pair of oppositely directed, resiliently yieldable pointers 15 and 16 for alignment with a preexisting line drawn on the floor F.

A cap member 17 is carried by the upper end of member 12 and has a pointer 18 thereon coplanar with the pointers 15 and 16.

An adjusting knob 19 is carried by the member 12 and rides in a slot 20 in member 11 for adjustably clamping the members 11 and 12 in different axially adjusted positions.

A bubble or bead-type level 21 is secured to the member 11 in a position to be readily observed by a person standing on the floor and holding the tool 10, whereby the tool may be leveled or made vertical in the plane of the pointers 15, 16 and 18.

A plumb level or plumb bar 22 is supported in enclosed relationship on the member 11 from a pivot point 23 at the top of member 11 and has a pointer 24 at its lower end disposed adjacent a flange 25 on which a mark 26 is provided for indicating when the plumb rod 22 is hanging in a vertical position, whereby the tool 10 may be vertically disposed in the plane perpendicular to the plane of pointers 15, 16 and 18.

Referring now to FIGS. 4, 5, 6 and 7, the elongate member 11 comprises an open-ended tubular body having a generally rectangularly shaped transverse cross-section and including a back wall 27, front wall 28 and opposite side walls 29 and 30. A pair of longitudinally extending flanges 31 and 32 are formed on the front wall 28 adjacent the opposite sides thereof and spaced inwardly from the opposite sides a distance approximately equal to the wall thickness of the body.

Figure 6:
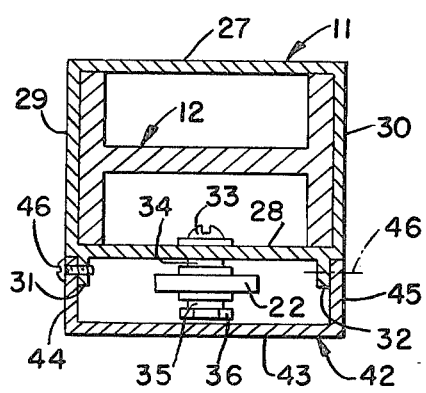
FIG. 6 is a view in section taken along line 6—6, in FIG. 1.
Figure 7:
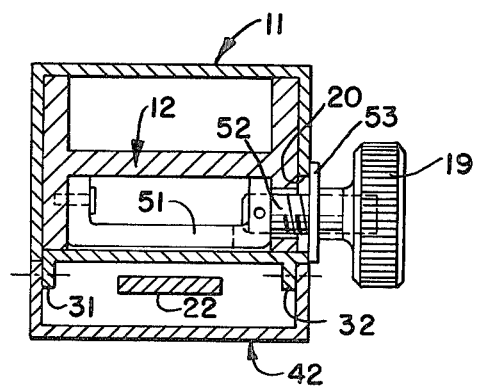
FIG. 7 is a view in section taken along line 7—7, in FIG. 1.

As noted previously, the pendulum of plumb bar 22 is suspended at its upper end from a pivot 23 and as seen best in FIG. 6, the pivot comprises a bolt or screw 33 extended through the front wall 28 of the member 11 and having a pair of spacers 35 thereon on opposite sides of the bar 22 and said spacers and bar being secured on the bolt or screw or the like by a suitable fastener 36.

The plumb bar 22 has a suitable weight 37 secured to the lower end thereof, and as seen in FIG. 4, the weight comprises a channel-shaped member to which the pointer 24 is secured. The pointer has an elongate, horizontal portion 38 with a slightly downturned end or point 39 thereon for improved accuracy in taking a reading, and a flattened portion 40 extending at right angles to the horizontal portion 38 and secured to the weight 37 by suitable fasteners such as rivets 41 or the like.

A substantially channel-shaped cover 42 is secured to the member 11 in enclosing relationship to the plumb bar 22 and has a front wall 43 and opposite side walls 44 and 45 disposed against the flanges 31 and 32 at the outer sides thereof, whereby the cover is substantially flush with the side walls 29 and 30 of the tubular body. The cover is secured to the flanges by means of suitable fasteners such as screws or the like 46 extended through the side walls 44 and 45 of the cover and through the flanges 31 and 32. The cover also has a top wall 47 to prevent rain and dirt and the like from entering the space enclosed by the cover.

As seen in FIG. 3, the flange 25 with the mark 26 thereon may be formed integrally with the cover 42 if desired, and a laterally extending slot 48 is provided in the lower end of the cover immediately above the flange 25, through which the pointer arm 38 extends.

Resilient bumpers or pads 49 and 50 are secured within the cover adjacent the lower end thereof in proximity to the weight 37 to cushion impact of the plumb rod or bar against opposite sides of the cover during handling of the tool.

The second extensible member 12 is generally I-shaped in transverse cross-section and is closely slidably received within the tubular body or member 11. A generally U-shaped brace 51 is secured to the member 12 within the tubular body for engagement with the clamping knob 19 and serves to brace the connection of the knob 19 with the member 12 to lend durability to the device during operation. In use, the knob 19 is loosened or unthreaded from stud 52, which projects through the slot 20 from the brace 51, thus freeing the member 12 for sliding movement relative to member 11. However, when the knob 19 is threaded onto or tightened relative to stud 52, the enlarged flange or washer 53 at the base of the knob causes the side wall 30 of body 11 to be tightly clamped between the knob and the member 12 thereby securely holding the extensible members 11 and 12 in the adjusted position.

A carrying handle 54 is also provided on the tubular body or member 11 to facilitate carrying the tool from one location to another.

In FIG. 5, details of construction of the foot member or base portion 13 can best be seen, and the foot member 13 comprises a tubular extension 55 having substantially the same cross-sectional dimensions as the lower end of tubular member or body 11 so as to extend substantially flush therewith. A pair of elongate, upwardly projecting braces 56 and 57 are carried by the extension 55 and extend upwardly into the interior of the open lower end of tubular body member 11. The braces 56 and 57 have aligned openings 58 and 59 therein, respectively, through which elongate fastening means 60 and 61 are extended for securing the foot member or base 13 to the elongate tubular body member 11. The fastening means 60 and 61 may comprise elongate screws with wing nuts or the like thereon, if desired, or other suitable fasteners may be utilized. Similarly, while the braces 56 and 57 have been shown as comprising generally channel shaped members secured to the extension 55 by means of rivets 62, the braces could obviously be secured with other types of fasteners, or for that matter, they would be formed integrally with the extension 55.

An elongate spring-retaining cylinder or socket 63 is secured within the extension 55 and has the pad or foot 14 slidably guided therein. A coil spring 64 is disposed within the spring-retaining cylinder 63, and is engaged between the closed end 65 of the cylinder 63 and a spring-retaining collar or flange 66 on the shaft 67 of foot or pad 14, whereby the foot or pad is constantly urged outwardly of the extension 55. Thus, the elongate members 11 and 12 may be positioned between the floor and ceiling surface and the knob 19 loosened and extensible member 12 extended to bring the pad or cap 17 into contact with the ceiling surface. The body or member 11 may then be forced downwardly against the bias of spring 64 driving the foot or pad 67 upwardly into the tube 63 a relatively short distance, and the knob 19 then tightened. Thus, the tool 10 will be firmly but resiliently engaged between the floor and ceiling surface, and when it is desired to move the tool, it can simply be forced further downwardly against the bias of spring 64 to effect a disengagement of the cap 17 with the ceiling surface, whereafter the tool may be tilted and transported to another location for use to mark a subsequent point.

The pointers 15 and 16 are mounted about pivot pins 68 and 69, respectively, and torsion springs 70 and 71 are disposed about the pivots and engaged with the extension 55 and the pointers 15 and 16, respectively, for resiliently urging the pointers downwardly against stop brackets 72 and 73 suitably secured to the extension 55 below the pointers 15 and 16. In other words, the stop brackets maintain the pointers 15 and 16 in slightly outwardly flared relationship whereby when they are placed downwardly against a floor surface, they yield resiliently outwardly and upwardly to enable the tool to be pressed downwardly against the bias of spring 64. At the same time, the springs 70 and 71 insure that the pointers 15 and 16 remain firmly in contact with a line or other mark on the floor to which the tool is being indexed.

While the tool 10 has been illustrated and described as being rectangular in transverse cross-section, it could have other cross-sectional configurations, such as circular or the like, as desired. Also, the tool could be made from metal, plastic or any other suitable material having sufficient durability and strength for the intended purpose. Further in this connection, the cover 42 could be snap-fitted to the body member 11, if desired, or otherwise secured thereto.

Moreover, an extension piece or pieces may be provided for use with the tool of the invention to increase the length thereof for use in situations where exceptionally great distances are encountered between floor and ceiling surfaces. For example, a piece structured similarly to the extension 55, but without the pointers and foot 14 thereon, could be removably assembled to the lower end of body member 11 and the foot member or base 13 secured, in turn, to the lower end of the extension piece or pieces.

In use, the tool 10 is positioned with the pointers 15 and 16 disposed in alignment with a line L drawn on the floor F of a building or the like, and the tool is then moved to an upright position, with the plumb 24 and level 21 indicating that the tool is vertical. The knob 19 is then loosened, and while the member or body 11 is held with one hand, the knob 19 is moved upwardly in the slot 20, carrying the extensible member 12 therewith until the pad or cap 17 engages the ceiling surface. The tool is then pressed downwardly against the spring 64 and the extensible member 12 is slid upwardly a slight additional distance until it again contacts the ceiling. Thereafter, the knob 19 is tightened.

Figure 12:
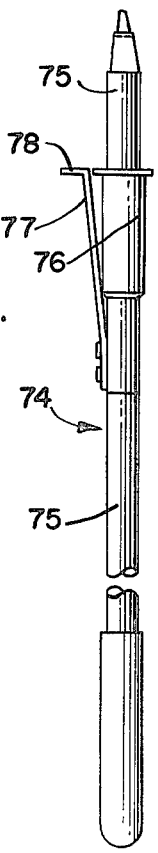
FIG. 12 is a fragmentary view in elevation of a combined marking pen holder tool or rod, and chalk line snapping tool used for marking a point on the ceiling surface while standing on the floor, and also for engaging a chalk line to snap the chalk line for striking a line between a pair of spaced points.

An instrument such as the marking rod 74 illustrated in FIG. 12, may then be used to support a marking pin 75 for marking a point at the pointer 18 on the upper end of extensible member 12. After the point is marked, the tool is pressed downwardly against the bias of spring 64, thereby releasing the tool from engagement with the ceiling and enabling the tool to be tilted sideways and carried to another location for marking of a subsequent point on the ceiling in a similar manner.

Referring again to the tool 74, it will be observed that it comprises an elongate handle 75 having a socket member 76 at the upper end thereof in which the marking pin or other suitable marking implement 75 may be inserted. Additionally, an upwardly projecting, string-engaging finger or bracket 77 is secured to the socket member 76 and has a laterally or horizontally directed flange or end portion 78 which may be positioned over a string S and twisted to secure the string and then pulled downwardly to place the string under tension, after which the handle 75 may be rotated to disengage the finger 77, 78 from the string to enable it to snap back against the surface such as ceiling C or the like to deposit chalk or other marking material thereon.

In this last connection, the pointer 18 on tool 10 may be provided with a hole or notch or the like 79 for engaging and holding one end of a string S.

Once pointers have been marked with the tool 10, as described previously herein, the unique chalk line holding tool 80 illustrated in FIGS. 8 and 9 may be used to snap a chalk line to leave a mark on the ceiling C. The tool 80 likewise comprises a pair of elongate members 11' and 12' axially adjustably secured together for extensible adjustment to different lengths, and to this end, a clamping collar 81, with an adjusting nut 82, is provided on the outer surface of the lower member 11' whereby the clamping nut 82 may be adjusted to securely clamp the members 11' and 12' together in a desired axially adjusted position. A friction pad 83 is provided on the lower end of member 11', and a resiliently yieldable extension 84 is telescopically received in the open upper end of member 12' and is biased axially outwardly of member 12' by a spring 85. A combined chalk line guide and friction pad 86 is releasably telescopically received over the upper end of extension 84 for frictional engagement with the ceiling surface and for holding and guiding a chalk line CL in proper position relative to a predetermined mark on the ceiling.

A supporting bracket 87 for the chalk line reel 88 is provided on the lower member 11' for supporting a chalk line CL to be carried by the chalk line support tool 80.

A similar tool 80' may be provided, which is constructed substantially identically to tool 80 except that it does not have a chalk box or reel holder 87 thereon, and the chalk line CL is merely extended through the combined chalk line guide and friction pad 86 and a knot 89 tied therein to prevent removal of the chalk line CL from the holder when the chalk line is stretched taut, as indicated in FIG. 13, for example.

The tools 80 and 80' may be made of any suitable material such as metal or plastic and the like and may be made either with a circular or cylindrical configuration as illustrated or they may have any other suitable configuration such as rectangular or the like, as desired. Moreover, one or the other of tools 80 and 80' may be used in combination with the tool 10, if desired; and particularly satisfactory results have been obtained when the tool 10 is used to mark a point and the tools 80 and 80' are then used to strike a chalk line. Of course, the tool 10 could serve the dual purpose of marking a point, and supporting a chalk line by means of the notch or hole 79, if desired, and in this event, one of the tools 80 or 80' could be eliminated.

Additionally, the tools 80 and/or 80' could be used with a modified friction pad 86', as seen in FIG. 10, to hold a channel or track and the like to the ceiling in order that the track or channel can be permanently secured thereto.

Thus, with the present invention, a unique apparatus is provided which enables one person to quickly and easily carry out the steps of marking points and lines for interior wall partitions and the like, and without requiring that person to climb ladders of other devices and thus substantially increasing the safety to the person as well as reducing the time and expense involved in marking such points and lines.

As this invention may be embodied in several forms without departing from the spirit or essential characteristics thereof, the present embodiment is, therefore, illustrative and not restrictive, since the scope of the invention is defined by the appended claims rather than by the description preceeding them, and all changes that fall within the metes and bounds of the claims or that form their functional as well as conjointly cooperative equivalents are, therefore, intended to be embraced by those claims.

We claim:

1. An apparatus for marking points and lines on a ceiling surface, comprising: a first layout tool having a plurality of elongate members adjustably secured together for axial extension relative to one another to different lengths for engagement between a ceiling and floor; a plumb rod suspended from the tool and having a pointer visible from externally of the tool for indicating when the tool is vertical in a first plane; a level mounted on the outside of the tool for indicating when the tool is vertical in a second plane perpendicular to the first plane; pointers at the top and bottom ends of the tool, for alignment of the pointer at the bottom end of the tool with an existing line or point on a floor of the building, whereby another point in vertical alignment with the line may be marked on the ceiling at the pointer on the top end of the tool, after the tool has been made vertical in both planes; chalk line holding means on the top end of the layout tool for holding one end of a chalk line in alignment with the pointer at the top of the tool; a chalk line carried by the layout tool and held by the chalk line holding means; and a second tool for holding the other end of the chalk line, whereby the chalk line may be stretched taut between the tools for marking a line on the ceiling, said second tool comprising a plurality of elongate members adjustably secured together for axial extension relative to one another to different lengths for engagement between a ceiling and floor, said tools enabling a single workman to mark points and lines on a ceiling in vertical alignment with points and lines on a floor while the workman is standing on the floor, and without requiring the use of ladders and the like.

2. An apparatus as in claim 1, wherein the means on the top end of the layout tool for holding the chalk line comprises an opening through the pointer; and the second tool has pointer means at the top end thereof for aligning the second tool with a mark on the ceiling.

3. An apparatus as in claim 2, wherein the second tool has a reel-holding bracket thereon for holding a chalk line reel on the tool.

4. An apparatus as in claim 3, wherein said tools each have an axially resiliently yieldable portion, whereby the tools may be adjusted to a length slightly greater than the distance between the floor and ceiling surfaces, and the yieldable portion compressed to firmly but releasably engage the top and bottom ends of the tools with the floor and ceiling surfaces.

5. Apparatus for marking points and lines on a ceiling surface of a building for laying out the location of interior walls and partitions and the like, comprising: a plurality of elongate, axially extensible tools each having a plurality of telescopically engaged members, and means for securing the members in axially adjusted positions; each tool including an axially resiliently yieldable portion, whereby the members may be adjusted to a length slightly greater than the distance between floor and ceiling surfaces, and the yieldable portion will compress to firmly but readily releasably hold the tool engaged between the floor and ceiling surfaces; combined line holding and alignment means on the upper ends of the tools for holding a chalk line against the ceiling surface in accurate alignment with a mark on the ceiling surface when the line is stretched tight between the tools, so that a chalk line may be made on a ceiling surface by a single workman standing on the floor surface; and a combined marking implement holder and chalk line snapping tool, said last named tool having an elongate handle with a string engaging look and a marking implement holder at one thereof.

6. An apparatus as in claim 5, wherein one of said tools has level means thereon for indicating when the tool is vertical, said level means including a plumb level connected to and suspended from the tool for indicating when the tool is vertical in a first vertical plane, and a bubble-type level on the tool for indicating when the tool is vertical in a second plane perpendicular to the first plane.

7. An apparatus as in claim 6, wherein another of said tools has holder means thereon for holding a chalk line reel; and said one tool has means thereon shielding the plumb level from ambient wind.

8. A layout tool for marking points and lines on a ceiling surface for locating walls and partitions and the like, comprising: a plurality of elongate, axially adjustably interengaged members defining a body having a floor surface engaging foot portion at one end and a ceiling surface engaging top end portion at the other end, the foot portion including a resiliently yieldable, axially outwardly biased foot member for engaging the floor, said plurality of elongate members being adjustable to a length such that the foot member is compressed axially inwardly, whereby the tool is firmly engaged at its top and bottom ends between the ceiling and floor, said tool being capable of being removed from engagement with the ceiling and floor by forcing the tool downwardly against the bias of the foot member to disengage the top end of the tool from the ceiling; level means carried by the body for indicating when the tool is in a vertical position and including a plumb level connected to and suspended from the body; means on the body shielding the plumb level from ambient wind; and pointer means on the foot portion and top end portion, for alignment of one of the pointer means with an existing mark, whereby a mark in vertical alignment with the existing mark may be made at said other pointer means after the tool is made vertical as indicated by the level means, the pointer means at the foot portion comprising a pair of oppositely, laterally outwardly directed pointers resiliently biased downwardly against the floor, whereby the pointers are disposed in contact with a line on the floor for any extended or compressed position of the foot member, said tool enabling a single workman standing on the floor to mark points and lines on a ceiling surface in vertical alignment with points and lines on a floor surface, without requiring the use of ladders and the like.

9. A layout tool as in claim 8, wherein the pointer means at the top end portion of the tool has a chalk line holding means combined therewith for holding one end of the chalk line in alignment with the pointer means.

10. A layout tool as in claim 8, wherein the foot portion is releasably secured to the bottom end of the elongate members.

11. A layout tool as in claim 8, wherein one of the elongate members comprises a tubular body, and the other elongate member is telescopically received in the tubular body; said plumb level being pivotally connected at one end to the outside of the body at the top end portion of the body, and extending at its other end to adjacent the bottom end of the body; and cover means secured to the body in enclosing relationship to the plumb level.

12. A layout tool as in claim 11, wherein the body has a pair of laterally spaced apart flanges extending longitudinally thereof, said cover being secured to the flanges in spanning relationship thereto, said plumb level being suspended in the space defined between the body, flanges and cover; and resilient bumper means on inner confronting surfaces of the flanges near the bottom thereof to cushion swinging movement of the plumb level.

13. A layout tool as in claim 12, wherein the plumb level comprises a rigid bar having weight means at the lower end thereof, and a pointer on the lower end of the bar projecting laterally forwardly from beneath the cover.

14. A layout tool as in claim 13, wherein the foot portion includes a resiliently yieldable, axially outwardly biased foot member for engaging the floor, said plurality of elongate members being adjustable to a length such that the foot member is compressed axially inwardly, whereby the tool is firmly engaged at its top and bottom ends between the ceiling and floor, said tool being capable of being removed from engagement with the ceiling and floor by forcing the tool downwardly against the bias of the foot member to disengage the top end of the tool from the ceiling.

15. A layout tool as in claim 14, wherein the pointer means at the floor portion comprises a pair of oppositely, laterally outwardly directed pointers resiliently biased downwardly against the floor, whereby the pointers are disposed in contact with a line on the floor for any extended or compressed position of the foot member.

16. A layout tool as in claim 15, wherein the pointer means at the top end portion of the tool has a chalk line holding means combined therewith for holding one end of the chalk line in alignment with the pointer means.

17. The method of marking points and lines on a ceiling surface for indicating the layout of interior walls and partitions and the like in building construction, comprising the steps of: locating an existing mark on a floor surface of the building; placing the bottom end of a first elongate tool on said existing mark in alignment therewith; making the tool vertical in two mutually perpendicular vertical planes; lengthening the tool axially to engage the top and bottom ends thereof with the ceiling and floor surfaces, respectively, with the tool in said vertical position; marking the ceiling surface with a first mark at the top end of the tool in vertical alignment with the existing mark on the floor surface; removing said tool and similarly positioning it in a vertical position at a location spaced from the first mark made on the ceiling surface; making a second mark at said location; supporting one end of a chalk line from the top end of the tool at said second mark; positioning a second elongate tool with the upper end thereof at said first mark on the ceiling surface; supporting the other end of the chalk line at the top end of the second elongate tool; and engaging and snapping the chalk line to make a chalk line mark on the ceiling surface between the two tools, all of said steps being carried out by a workman standing on the floor surface.

* * * * *